United States Patent
Suzuki et al.

(10) Patent No.: US 7,016,777 B2
(45) Date of Patent: Mar. 21, 2006

(54) DECELERATION CONTROL APPARATUS AND METHOD FOR AUTOMOTIVE VEHICLE

(75) Inventors: Tatsuya Suzuki, Kanagawa (JP); Genpei Naitou, Yokohama (JP); Shinji Matsumoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/072,415

(22) Filed: Mar. 7, 2005

(65) Prior Publication Data

US 2005/0216162 A1    Sep. 29, 2005

(30) Foreign Application Priority Data

Mar. 15, 2004    (JP)    ............... 2004-073125

(51) Int. Cl.
   *G06F 19/00*    (2006.01)
(52) U.S. Cl. ............... 701/70; 701/72; 701/78; 701/79; 701/80; 303/140
(58) Field of Classification Search ........... 701/70, 701/72, 74, 78, 79, 80, 90, 91, 93; 303/139–163; 180/197

See application file for complete search history.

(56) References Cited

U.S. PATENT DOCUMENTS

| 6,081,761 | A | 6/2000 | Harada et al. |
| 6,188,316 | B1 | 2/2001 | Matsuno et al. |
| 6,266,600 | B1 | 7/2001 | Miyazaki |
| 6,577,941 | B1 | 6/2003 | Kawasaki et al. |
| 6,691,017 | B1 * | 2/2004 | Banno et al. ............ 701/84 |
| 6,732,039 | B1 * | 5/2004 | Ino et al. ............... 701/93 |
| 6,778,896 | B1 | 8/2004 | Matsuura et al. |
| 6,792,344 | B1 * | 9/2004 | Minowa et al. .......... 701/96 |
| 6,910,746 | B1 * | 6/2005 | Kato et al. ............. 303/140 |
| 6,941,213 | B1 * | 9/2005 | Yasui et al. ............ 701/80 |

FOREIGN PATENT DOCUMENTS

| JP | 11-255004 A | 9/1999 |
| JP | 2001-52298 A | 2/2001 |
| JP | 2001-334920 A | 12/2001 |

OTHER PUBLICATIONS

US 6,463,376, 10/2002, Kawasaki et al. (withdrawn)

* cited by examiner

*Primary Examiner*—Richard M. Camby
(74) *Attorney, Agent, or Firm*—Foley & Lardner LLP (57) ABSTRACT

There is provided a deceleration control apparatus for an automotive vehicle, including a target vehicle speed calculation unit that calculates a target vehicle speed and a deceleration control unit that performs deceleration control on the vehicle so that the vehicle reaches the target vehicle speed. The target vehicle speed calculation unit has a first target vehicle speed calculating section to give as the target vehicle speed a first target vehicle speed value by dividing a multiplication product of an estimated road friction coefficient and a predetermined target lateral acceleration limit by a determined actual yaw rate, and a target vehicle speed correcting section to correct the target vehicle speed depending on an accelerator pedal depression and a detected actual lateral acceleration, so as to adjust the amount of deceleration control on the vehicle.

16 Claims, 6 Drawing Sheets

DECELERATION CONTROL APPARATUS AND METHOD FOR AUTOMOTIVE VEHICLE

BACKGROUND OF THE INVENTION

The present invention relates to an apparatus and method for performing deceleration control on an automotive vehicle in accordance with a turning state of the vehicle.

Japanese Laid-Open Patent Publication No. H10-278762 discloses a deceleration control apparatus for an automotive vehicle, which is configured to estimate a road friction coefficient, determine a maximum limit of vehicle lateral acceleration based on the estimated road friction coefficient, and then, performs deceleration control on the vehicle in such a manner that the actual vehicle lateral acceleration does not exceed the maximum lateral acceleration limit, so as to attain stable, smooth vehicle behavior according to road conditions and prevent a vehicle rollover during turning.

SUMMARY OF THE INVENTION

In the above-disclosed type of deceleration control apparatus, the maximum lateral acceleration limit is based only on the estimated road friction coefficient. There thus arises a case where the maximum lateral acceleration limit is set lower than an appropriate value due to an underestimation of the road friction coefficient. In such a case, the acceleration of the vehicle becomes limited even under a driver's accelerator pedal operation at the time the vehicle shifts from a curved road to a straight road. This results in driver discomfort.

It is therefore an object of the present invention to provide an apparatus and method for performing deceleration control on an automotive vehicle in accordance with a turning state of the vehicle without causing driver discomfort.

According to a first aspect of the present invention, there is provided a deceleration control apparatus for an automotive vehicle, comprising: an accelerator pedal depression detecting unit that detects an accelerator pedal depression of the vehicle; a lateral acceleration detecting unit that detects an actual lateral acceleration of the vehicle; a yaw rate determination unit that determines an actual yaw rate of the vehicle; a road friction coefficient estimation unit that estimates a friction coefficient of a road on which the vehicle is traveling; a target vehicle speed calculation unit that calculates a target vehicle speed; and a deceleration control unit that performs deceleration control on the vehicle so that the vehicle reaches the target vehicle speed, the target vehicle speed calculation unit having: a first target vehicle speed calculating section to give as the target vehicle speed a first target vehicle speed value by dividing a multiplication product of the estimated road friction coefficient and a predetermined target lateral acceleration limit by the determined actual yaw rate; and a target vehicle speed correcting section to correct the target vehicle speed depending on the accelerator pedal depression and the detected actual lateral acceleration, so as to adjust the amount of the deceleration control on the vehicle.

According to a second aspect of the present invention, there is provided an apparatus for performing deceleration control on an automotive vehicle in accordance with a turning state of the vehicle, comprising: means for determining an actual yaw rate of the vehicle; means for detecting an actual lateral acceleration of the vehicle; means for detecting an accelerator pedal depression of the vehicle; means for estimating a friction coefficient of a road on which the vehicle is traveling; means for calculating a target vehicle speed based on the estimated road friction coefficient, the detected actual lateral acceleration and the detected accelerator pedal operation; means for calculating a target deceleration from the target vehicle speed; and means for controlling engine throttle opening and brake fluid pressure of the vehicle according to the target deceleration.

According to a third aspect of the present invention, there is provided a method for performing deceleration control on an automotive vehicle, comprising in accordance with a turning state of the vehicle: determining an actual yaw rate of the vehicle; detecting an actual lateral acceleration of the vehicle; detecting an accelerator pedal depression of the vehicle; estimating a friction coefficient of a road on which the vehicle is traveling; calculating a target vehicle speed based on the estimated road friction coefficient, the detected actual lateral acceleration and the detected accelerator pedal depression; calculating a target deceleration from the target vehicle speed; and controlling engine throttle opening and brake fluid pressure of the vehicle according to the target deceleration.

The other objects and features of the invention will also become understood from the following description.

DESCRIPTION OF THE EMBODIMENTS

The present invention will be described in detail by way of the following first to fourth embodiment, in which like parts and portions are designated by like reference numerals so as to omit repeated explanations thereof.

Figure 1:
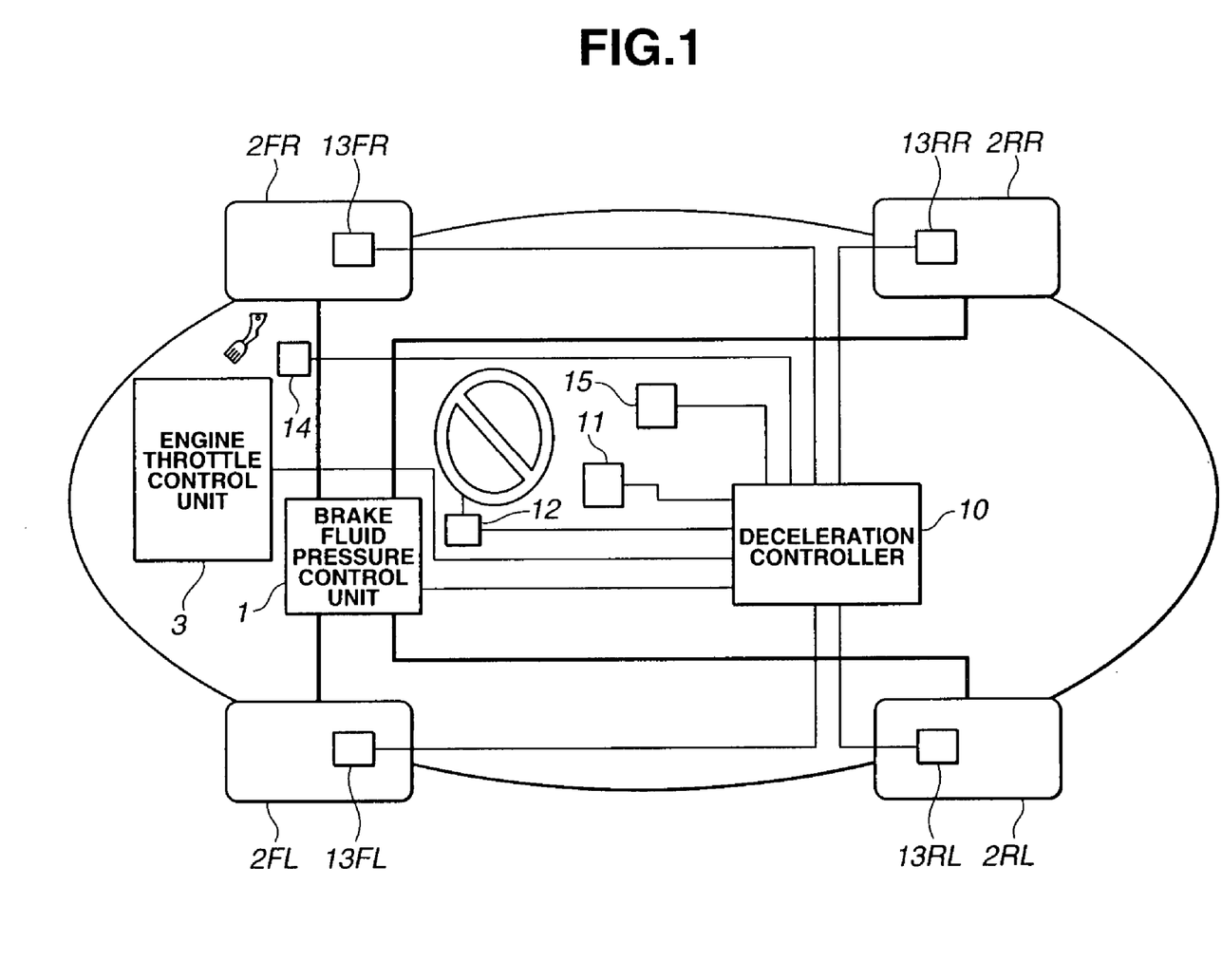
FIG. 1 is a schematic view of a vehicle equipped with a deceleration controller according to first through fourth embodiments of the invention.

Each of the first to fourth embodiments refers to a four-wheel vehicle equipped with brake fluid pressure control unit 1, engine throttle control unit 3 and deceleration controller 10 as shown in FIG. 1. Brake fluid pressure control unit 1 is disposed between a master cylinder and wheel cylinders of the vehicle and controls pressures of brake fluid supplied to the respective cylinders of front-left wheel 2FL, front-right wheel 2FR, rear-left wheel 2RL and rear-right wheel 2RR of the vehicle. Although the brake fluid is normally pressurized by the master cylinder and supplied to each wheel cylinder in response to a driver's brake pedal depression, brake fluid pressure control unit 1 operates under a brake fluid pressure control signal from deceleration controller 10 (irrespective of a driver's brake pedal operation) to control the brake fluid pressure. Herein, brake fluid control unit 1 may employ a fluid pressure control circuit configuration suitable for use in antiskid control or traction control. Engine throttle control unit 3 operates under its own control or under a throttle opening control signal from deceleration controller 10, to control an engine throttle opening of the vehicle.

There is further provided in the vehicle various detecting units including: yaw rate sensor 11 to detect an actual yaw rate $\phi'$ of the vehicle by measurement (hereinafter referred to as a "yaw rate sensor value"); steering angle sensor 12 to detect a steering (wheel) angle $\delta$ of the vehicle, wheel speed sensors 13FL, 13FR, 13RL and 13RR to detect rotation speeds $V_{wi}$ (i=FL, FR, RL and RR) of vehicle wheels 2FL, 2FR, 2RL and 2RR (hereinafter referred to as "wheel speeds"), respectively; accelerator pedal sensor 14 to detect a depression $\theta$th of an accelerator pedal of the vehicle; and lateral acceleration sensor 15 to detect an actual lateral acceleration Yg of the vehicle (hereinafter occasionally referred to as a "lateral acceleration sensor value"). These sensors 11–12, 13FL, 13FR, 13RL, 13RR and 14–15 output signals responsive to the detected vehicle parameters to deceleration controller 10.

Deceleration controller 10 performs deceleration control on the vehicle in accordance with a turning state of the vehicle on the basis of the detection signals from the sensors 11–12, 13FL, 13FR, 13RL, 13RR and 14–15.

Figure 2:
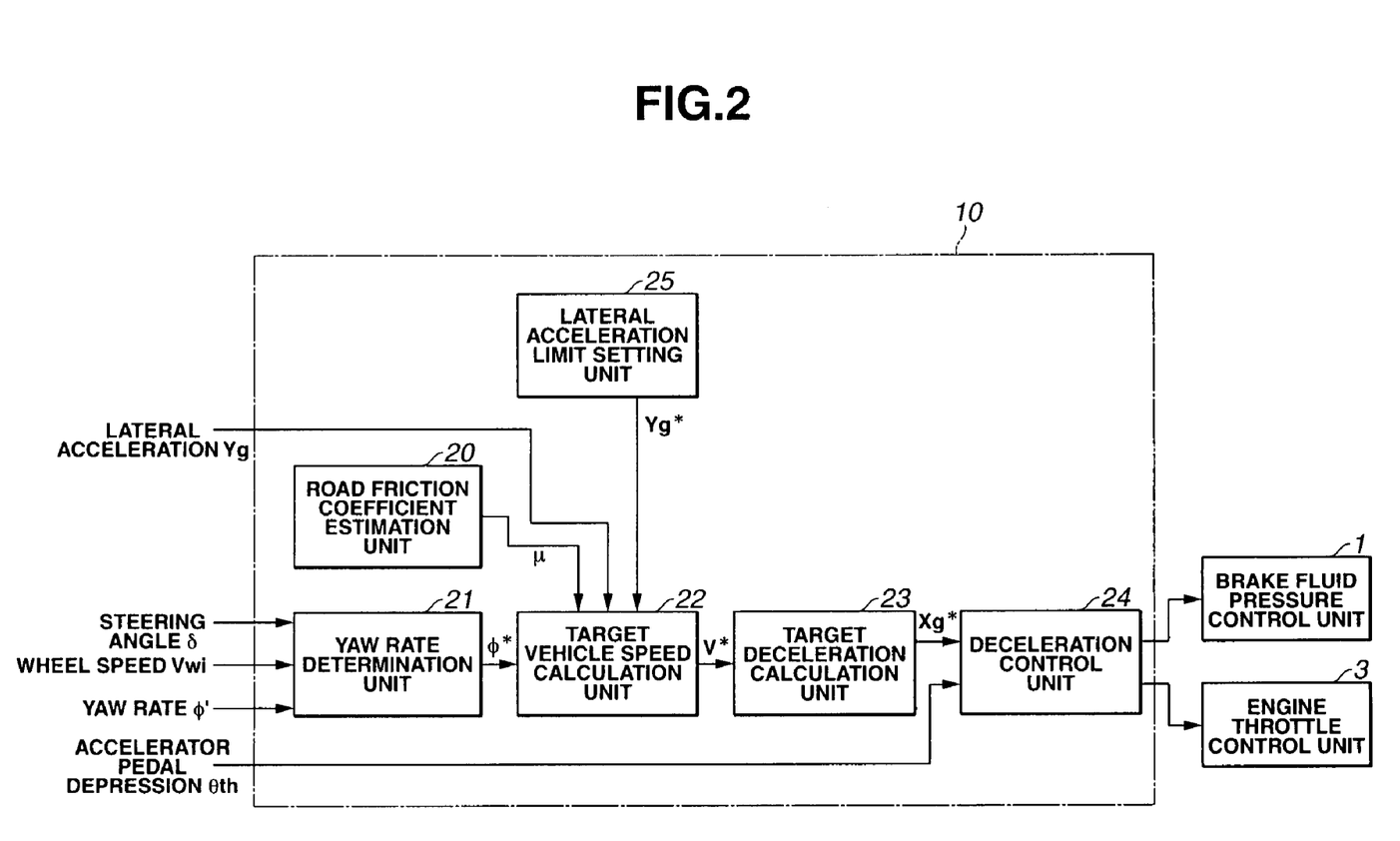
FIG. 2 is a block diagram of the deceleration controller of FIG. 1.

As shown in FIG. 2, deceleration controller 10 includes: road friction coefficient estimation unit 20 that estimates the friction coefficient $\mu$ of a road on which the vehicle is traveling; yaw rate determination unit 21 that determines a yaw rate $\phi^*$ of the vehicle, for use in the following operation processing, with reference to the steering angle $\delta$, the wheel speeds $V_{wi}$ (i=FL, FR, RL and RR) and the yaw rate sensor value $\phi'$; lateral acceleration limit setting unit 25 that sets a lateral acceleration limit Yg* for the vehicle; target vehicle speed calculation unit 22 that calculates a target vehicle speed V* based on the yaw rate $\phi^*$, the lateral acceleration Yg and the road friction coefficient $\mu$; target deceleration calculation unit 23 that calculates a target deceleration Xg* from the target vehicle speed V*; and deceleration control unit 24 that controls brake fluid pressure control unit 1 and engine throttle control unit 3 under the brake fluid pressure control signal and the throttle opening control signal, respectively, so as to achieve the target deceleration Xg*. Although road friction coefficient estimation unit 20 estimates the road friction coefficient $\mu$ by calculation in the first to fourth embodiments, the method for calculation of the road friction coefficient $\mu$ is not particularly limited. For example, the road friction coefficient $\mu$ can be calculated by computing a slip ratio from the wheel speeds $V_{wi}$ (a ratio between the front and rear wheel speeds), obtaining a relational formula between the slip ratio and the vehicle acceleration or deceleration, and then, determining a slope of the relational formula as disclosed in U.S. Patent Publication No. 6,577, 941, which is herein incorporated by reference. Road friction coefficient estimation unit 20 may be provided separately from deceleration controller 10. Instead of providing road friction coefficient unit 20, a road friction coefficient sensor can alternatively be mounted onto the vehicle so as to estimate the road friction coefficient $\mu$ by measurement. One example of road friction coefficient sensor is discussed in U.S. Pat. No. 6,266,600, which is herein incorporated by reference.

Figure 3:
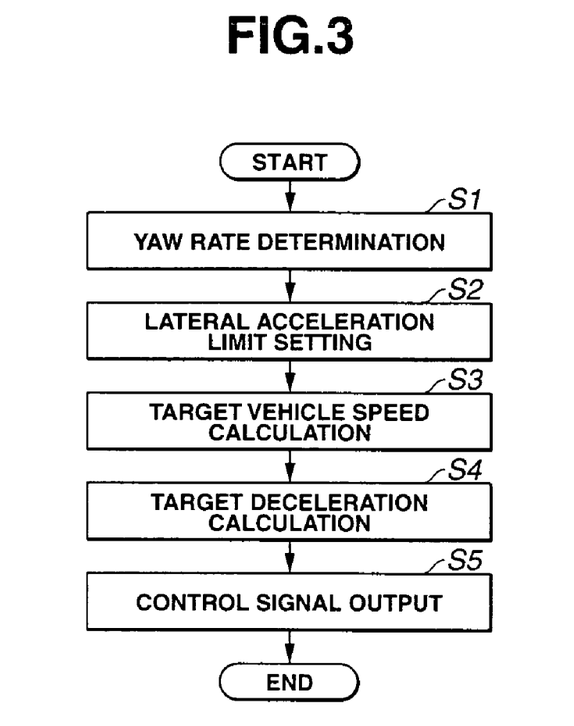
FIG. 3 is a flowchart of a main control program of the deceleration controller according to the first embodiment of the invention.

In the first embodiment, the vehicle deceleration control is performed through the following control program, as shown in FIG. 3, by timer interruptions at established intervals.

Figure 4:
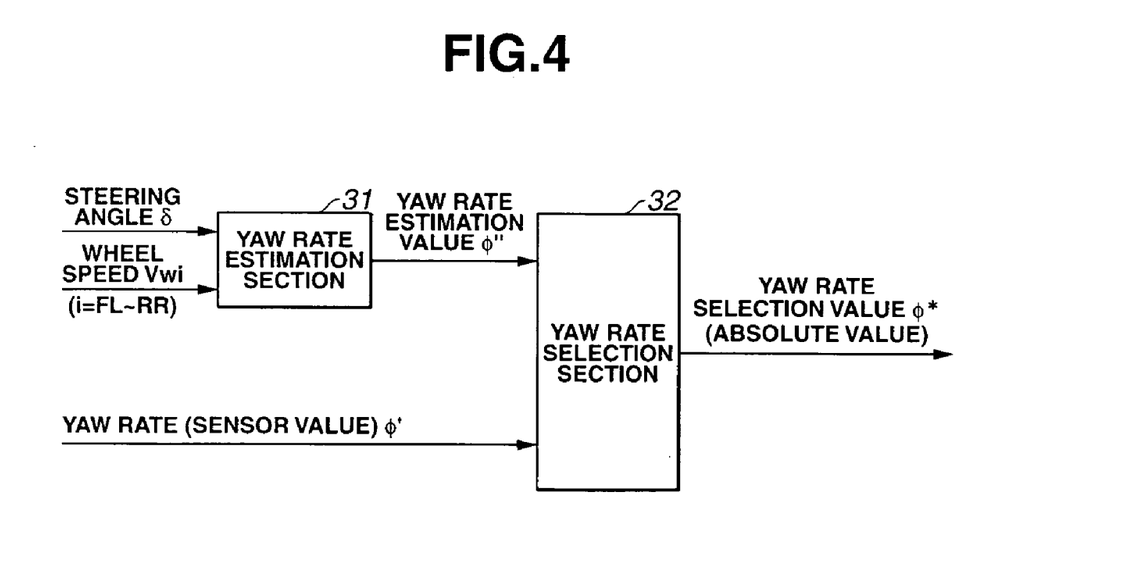
FIG. 4 is a block diagram of a yaw rate calculation unit of the deceleration controller of FIG. 1.

Deceleration controller 10 first enables yaw rate determination unit 21 to determine the vehicle yaw rate $\phi^*$ at step S1. Yaw rate determination unit 21 has estimation section 31 and selection section 32 as shown in FIG. 4. Estimation section 31 estimates an actual yaw rate $\phi''$ of the vehicle (hereinafter referred to as a "yaw rate estimation value") by calculation based on the steering angle $\delta$ and the wheel speeds $V_{wi}$ (i=FL, FR, RL and RR). The yaw rate estimation value can be obtained by e.g. calculating a traveling speed of the vehicle from the wheel speeds $V_{wi}$ and estimating the vehicle yaw rate based on the steering angle $\delta$ and the vehicle traveling speed according to a known method. Then, estimation section 31 outputs the yaw rate estimation value to selection unit 32. Selection unit 32 selects the higher one of the yaw rate sensor value $\phi'$ and the yaw rate estimation value $\phi''$ and outputs the thus-obtained actual yaw rate selection value $\phi^*$ (>0) to target vehicle speed calculation unit 22. Generally, the yaw rate estimation value $\phi''$ can be obtained faster than the yaw rate sensor value $\phi'$. The use of the raw rate estimation value $\phi''$ in the vehicle deceleration control thus results in quick control response. In low-friction road conditions, however, there are some vehicle behavior modes (such as a slow-spin mode) in which the actual yaw rate of the vehicle becomes increased even under little steering. For this reason, the higher one of the yaw rate sensor value $\phi'$ and the yaw rate estimation value $\phi''$ is selected and used in the subsequent operation processing, so as to allow early intervention of the vehicle deceleration control.

At step S2, deceleration controller 10 enables lateral acceleration limit setting unit 25 to set the lateral acceleration limit Yg* according to the following expression (1):

$$Yg^* = Yga \qquad (1)$$

where Yga is a fixed limit value of target lateral acceleration (e.g. approximately 0.45 G) up to which the vehicle can travels stably on a curved road without developing a spin, a drift out or a turnover (rollover).

At step S3, deceleration controller 10 enables target vehicle speed calculation unit 22 to calculate the target vehicle speed V*.

Figure 5:
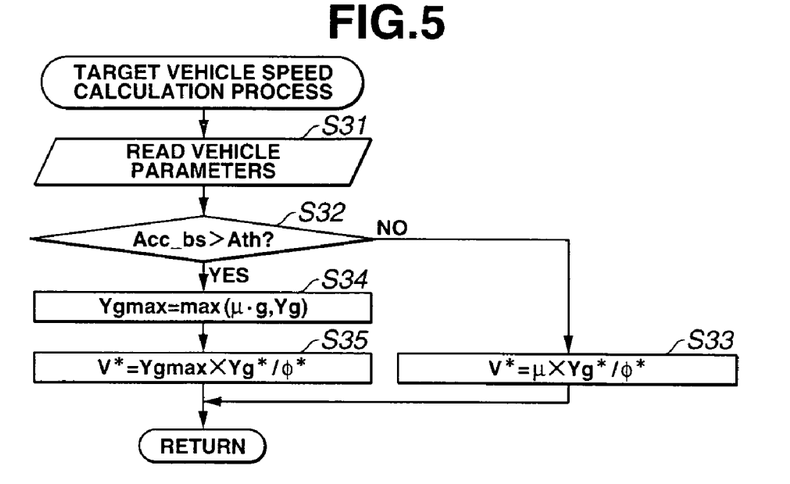
FIG. 5 is a flowchart of a target vehicle speed calculation subroutine program of the deceleration controller according to the first embodiment of the invention.

The target vehicle speed V* is calculated through the following subroutine shown in FIG. 5 in the first embodiment.

At step S31, target vehicle speed calculation unit 22 reads various vehicle parameters including the road friction coefficient $\mu$, the lateral acceleration sensor value Yg, the lateral acceleration limit Yg*, the yaw rate selection value $\phi^*$ and the engine throttle opening Acc_bs corresponding to the accelerator pedal depression $\theta$th (hereinafter referred to as a "base throttle opening"). If the vehicle has an adaptive cruise control system or a speed control system so as to automatically control the accelerator, the base throttle opening Acc_bs may be set corresponding to such an automatic accelerator control operation.

Target vehicle speed calculation unit 22 judges at step S32 whether the accelerator pedal depression $\theta$th is largher than a given threshold, i.e., whether the base throttle opening Acc_bs is larger than a given accelerator operation threshold Ath (e.g. 5%).

If Acc_bs≦Ath (No at step S32), it is judged that the accelerator pedal is not operated by a driver. Then, program control proceeds to step S33. At step S33, target vehicle speed calculation unit 22 gives the target vehicle speed V* by the following expression (2):

$$V^* = \mu \times Yg^*/\phi^* \qquad (2)$$

where $\mu$ is the estimated road friction coefficient; $\phi^*$ is the yaw rate selection value determined at step S1; and Yg* is the lateral acceleration limit set at step S2. As is evident from the expression (2), the calculated target vehicle speed V* decreases as the road friction coefficient $\mu$ becomes lower, as the lateral acceleration limit Yg* becomes lower and as the yaw rate selection value $\phi^*$ becomes higher.

On the other hand, it is judged that the accelerator pedal is operated by a driver if Acc_bs>Ath (Yes at step S32). Program control then proceeds to step S34. At step S34, target vehicle speed calculation unit 22 selects the higher one of the lateral acceleration sensor value Yg and the result of multiplication of the road friction coefficient $\mu$ by a gravitational acceleration g as indicated by the following expression (3):

$$Ygmax = max(\mu \times g, Yg) \qquad (3)$$

where max ( ) is a functional operator for selecting the higher one of the values inside the parentheses.

At step S35, target vehicle speed calculation unit 22 gives the target vehicle speed V* by the following expression (4):

$$V^* = Ygmax \times Yg^*/\phi^* \qquad (4)$$

where $\phi^*$ is the yaw rate selection value determined at step S1; Yg* is the lateral acceleration limit set at step S2; and Ygmax is the higher one of the lateral acceleration sensor value Yg and the multiplication product $\mu \times g$ selected at step S34.

It is clear from comparison of the expressions (2) and (4) that the multiplication product Ygmax×Yg* is used in the expression (4) in place of the lateral acceleration calculation value $\mu \times Yg^*$ used in the expression (2). This makes it possible to reflect the lateral acceleration sensor value Yg through the target vehicle speed V* such that the target vehicle speed V* increases with the lateral acceleration sensor value Yg when the road friction coefficient $\mu$ is estimated to be lower than its actual value in a situation that the vehicle actually undergoes high lateral acceleration.

Upon determination of the target vehicle speed V* at step S33 or S35, control exits from the timer interruption subroutine and returns to the main routine.

Next, deceleration controller 10 enables at step S4 target deceleration calculation unit 23 to calculate the target deceleration Xg* according to the following expression (5):

$$Xg^* = K \times \Delta V/\Delta t \qquad (5)$$

where $\Delta V$ is a difference between the actual vehicle speed V and the target vehicle speed V* ($\Delta V = V - V^*$); $\Delta t$ is a predetermined time (to reduce the vehicle speed difference $\Delta V$ to zero); and K is a gain factor.

As is evident from the expression (5), the calculated target deceleration Xg* increases as the vehicle speed difference $\Delta V$ becomes larger i.e. as the difference between V and V* becomes positively increased.

The target deceleration Xg* may alternatively be given by the following expression (6) in consideration of the increment of vehicle speed difference:

$$Xg^* = (K1 \times \Delta V + K2 \times d\Delta V)/\Delta t \qquad (6)$$

where $d\Delta t$ is the difference between the present vehicle speed difference value $\Delta V$ and the past vehicle speed difference value $\Delta Vz$ ($d\Delta t = \Delta V - \Delta Vz$).

This makes it possible to calculate the target deceleration Xg* so as to decelerate the vehicle instantaneously under fast steering.

At step S5, deceleration controller 10 enables deceleration control unit 24 to output brake fluid pressure and throttle opening control signals to control brake fluid pressure control unit 1 and engine throttle control unit 3, respectively, in such a manner that the vehicle reaches the target vehicle speed V* and the target deceleration Xg*.

Figure 6:
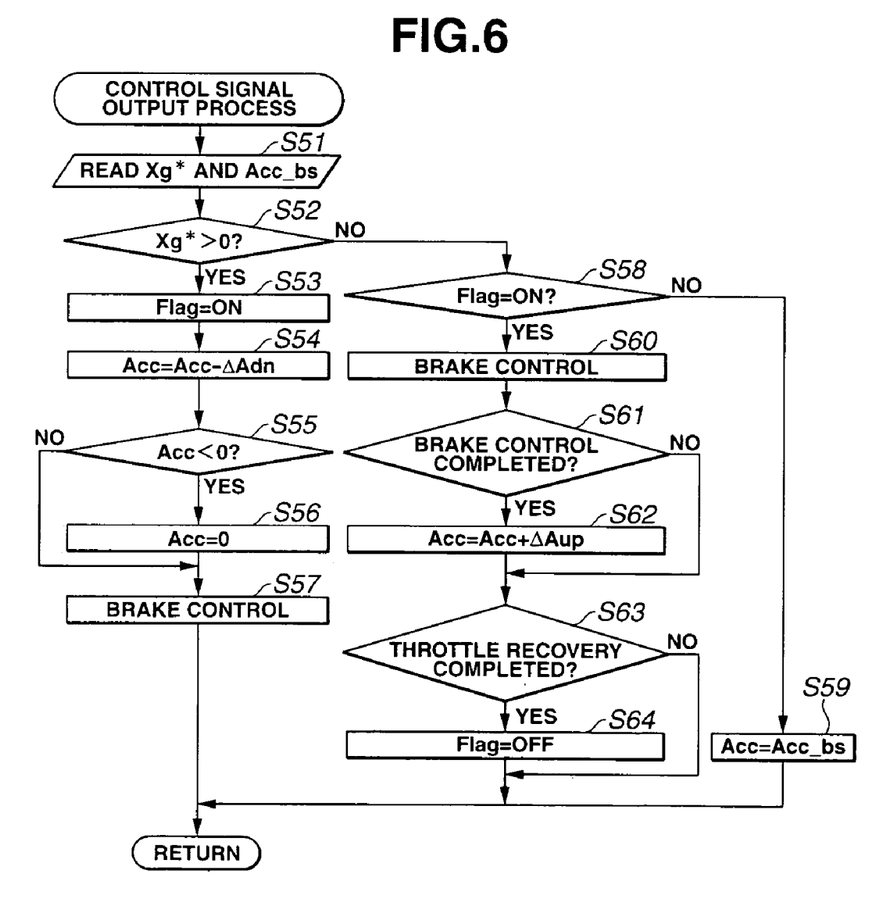
FIG. 6 is a flowchart of a control signal output subroutine program of the deceleration controller according to the first embodiment of the invention.

The brake fluid pressure and throttle opening control signals are output through the following subroutine shown in FIG. 6 in the first embodiment.

At step S51, deceleration control unit 24 first reads the target deceleration Xg* and the base throttle opening Acc_bs.

At step S52, deceleration control unit 24 judges whether the target deceleration Xg* is larger than zero. If Xg*>0 (Yes at step S52), it is judged that the vehicle is to be decelerated. Then, program control proceeds to step S53. If Xg*≦0 (No at step S52), it is judged that the vehicle is to be accelerated. Program control then proceeds to step S58.

At step S53, deceleration control unit 24 sets a deceleration control flag "Flag" to the ON position (Flag=ON) indicating the intervention of the vehicle deceleration control.

At step S54, deceleration control unit 24 decrements the target throttle opening Acc by a given amount $\Delta Adn$ at each sampling as indicated by the following expression (7):

$$Acc = Acc - \Delta Adn \qquad (7).$$

The initial value of the target throttle opening Acc is set to the base throttle opening Acc_bs.

At step S55, deceleration control unit 24 judges whether the present target throttle opening Acc is smaller than zero. If Acc<0 (Yes at step S55), program control proceeds to step S56. If Acc≧0 (No at step S55), program control directly proceeds to step S57.

At step S56, deceleration control unit 24 sets the target throttle opening Acc to 0 (zero) to thereby prevent the target throttle opening Acc from becoming smaller than zero. Program control then proceeds to step S57.

Deceleration control unit 24 controls at step S57 brake fluid pressure control unit 1 so as to increase the brake fluid pressure to a predetermined level.

In this way, the vehicle is decelerated by the throttle control operation at steps S54 to S56 and by the brake control operation at step S57 when the target deceleration Xg* is larger than zero (Xg*>0). After step S57, control exits from the timer interruption subroutine and then returns to the main routine.

When the target deceleration Xg* is smaller than or equal to zero (Xg*≦0), deceleration control unit 24 judges at step S58 whether the deceleration control flag has been set to the ON position. If Flag=OFF (No at step S58), it is judged that the vehicle deceleration control has never intervened before. Then, program control proceeds to step S59. If Flag=ON (Yes at step S58), it is judged that the vehicle deceleration control has intervened. Program control then proceeds to step S60.

At step S59, deceleration control unit 24 resets the target throttle opening Acc to the base throttle opening Acc_bs as indicated by the following expression (8):

$$Acc=Acc\_bs \quad (8).$$

After step S59, control exits from the timer interruption subroutine without performing throttle and brake control operations and returns to the main routine.

At step S60, deceleration control unit 24 controls brake fluid pressure control unit 1 so as to decrease the brake fluid pressures.

At step S61, deceleration control unit 24 judges whether the brake control operation has completed. If Yes at step S61, program control proceeds to step S62. If No at step S61, program control directly proceeds to step S63.

At step S62, the deceleration control unit 24 increments the target throttle opening Acc by a predetermined amount ΔAup at each sampling, for throttle recovery, as indicated by the following expression (9):

$$Acc=Acc+\Delta Aup \quad (9).$$

After that, program control proceeds to step S63.

At step S63, the deceleration control unit 24 checks whether the throttle recovery has completed. If the throttle recovery has completed so that the throttle opening recovers to the base throttle opening Acc_bs (Yes at step S63), program control proceeds to step S64. If the throttle recovery has not completed (No at step S63), control exits from the timer interruption subroutine and returns to the main routine for continuation of the throttle recovery.

At step S64, the deceleration control unit 24 resets the deceleration control flag to the OFF position. Then, control exits from the timer interruption subroutine and returns to the main routine.

It is now assumed that the vehicle is traveling on a straight road on the condition that the target deceleration Xg* is set lower than or equal to zero (Xg*≦0). In this straight-running state, program control goes from step S52 to step S58 upon judgment of "No" at step S52 in the control signal output subroutine. If the vehicle deceleration control has never intervened such that the deceleration control flag remains at the initial OFF position (Flag=OFF), control goes from step S58 to step S59. The target throttle opening Acc is set to the base throttle opening Acc_bs (corresponding the accelerator pedal depression θth) at step S59. Accordingly, the vehicle keeps on running in response to a driver's accelerator pedal operation without intervention of the vehicle deceleration control.

It is next assumed that the vehicle subsequently comes to a curved road and shifts from the above straight-running state to a turning state. When the target vehicle speed V* decreases with increase in vehicle yaw rate, the target deceleration Xg* becomes higher than zero (Xg*>0). Program control goes from step S52 to step S53 upon judgment of "Yes" at step S52 in the control signal output subroutine. The deceleration control flag is set to the ON position (Flag=ON) at step S53, and then, the vehicle is decelerated by the throttle control operation at steps S54 to S56 (in which the target throttle opening Acc gradually decreases from the base throttle opening Acc_bs) and by the brake control operation at step S57 (in which the brake fluid pressure increases to the predetermined level). Through such deceleration control, the vehicle can be prevented from overspeeding during turning. This vehicle deceleration control can be performed without giving an abrupt deceleration feeling to the driver, as the target throttle opening Acc is decremented by the given amount ΔAnd at each sampling even under a driver's accelerator pedal operation.

The ease of intervention of the vehicle deceleration control increases with decrease in the road friction coefficient $\mu$ when the accelerator pedal is not operated during turning of the vehicle. Under no (undetectable) accelerator pedal operation, control goes from step S32 to step S33 in the target vehicle speed calculation subroutine. The target vehicle speed V* is calculated at step S33 using the road friction coefficient $\mu$ according to the expression (2) so that the target vehicle speed V* decreases with the road friction coefficient $\mu$, thereby leading to a higher target deceleration Xg*. In the subsequent control signal output subroutine, control goes from step S52 to step S53 upon judgment of "Yes" at step S52. The vehicle is then gradually decelerated by the throttle control operation and by the brake control operation, so as to show smooth vehicle turning behavior.

By contrast, control goes to steps S34 and S35 in the target vehicle speed calculation subroutine when the accelerator pedal is operated. The target vehicle speed V* is calculated at step S35 using the select-high value Ygmax according to the expressions (3) and (4). If the road friction coefficient $\mu$ is estimated to be lower than its actual value, the lateral acceleration sensor value Yg is selected as Ygmax in a situation that the vehicle actually undergoes high lateral acceleration during turning. This leads to a higher target vehicle speed V* and a lower target deceleration Xg* so as to limit the intervention of the vehicle deceleration control and avoid such driver discomfort that the vehicle cannot be accelerated in response to a driver's accelerator pedal operation.

It is very likely that the vehicle deceleration control deteriorates in control response at the time the vehicle shifts from a low-friction road to a high-friction road because the road friction coefficient $\mu$ is estimated by calculation. Accordingly, there has been a problem that the driver has a stall feeling for a longer time under vehicle deceleration control of the earlier technology in which the target vehicle speed is only determined based on the road friction coefficient. In the first embodiment, however, the target vehicle speed V* is calculated based on the higher one of the lateral acceleration sensor value Yg and the multiplication product $\mu \times g$ according to the expressions (3) and (4) under vehicle deceleration control. The intervention of the vehicle deceleration control becomes thus limited quickly upon selection of the lateral acceleration selection value Yg even though the estimation of the road friction coefficient $\mu$ is slow in response to changes in road friction conditions.

It is finally assumed that the vehicle exits from a curved road so that the target deceleration Xg* is again set smaller than or equal to zero (Xg*≦0). In the control signal output subroutine, control goes from step S52 to step S58. As the vehicle deceleration control has intervened, the deceleration control flag is in the ON position (Flag=ON). Then, control goes from step S58 to S60 upon judgment of "Yes" at step S58. The brake fluid pressures are adjusted into a decreasing direction at step S60, and then, the throttle opening gradually increases to the base throttle opening Acc_bs corresponding to the accelerator pedal depression θth at step S62. When the engine throttle opening fully recovers, the deceleration control flag is set to the OFF position so as to terminate the vehicle deceleration control.

As described above, target vehicle speed calculation unit 22 has a first target vehicle speed calculating section (corresponding to step S33) for giving a first vehicle speed value by dividing the multiplication product of the road friction coefficient $\mu$ and the lateral acceleration limit Yg* by the yaw rate $\phi$*, a second vehicle speed calculating section (corresponding to steps S34–S35) for giving a second target vehicle speed value by selecting the higher one of the lateral acceleration sensor value Yg and the multiplication result $\mu$×g and then dividing the multiplication product of the thus-obtained select-high value Ygmax (=Yg or $\mu$×g) and the lateral acceleration limit Yg* by the yaw rate $\phi$*, and a correcting section (corresponding to step S32) for switching between the first and second target vehicle speed values to correct the target vehicle speed V* depending on the accelerator pedal depression θth and the lateral acceleration sensor value Yg and thereby adjust the amount of deceleration control on the vehicle in the first embodiment. In other words, the target vehicle speed V* is calculated based on the higher one of the lateral acceleration sensor value Yg and the multiplication product $\mu$×g when the accelerator pedal depression θth is detected. It is therefore possible to correct the target vehicle speed V* to a higher value upon selection of the lateral acceleration sensor value Yg as Ygmax so as to limit the intervention of the vehicle deceleration control and avoid giving a stall feeling to the driver, even though the road friction coefficient $\mu$ is estimated to be lower than its actual value, in a situation that the vehicle undergoes lateral acceleration in response to a driver's accelerator pedal operation during shifting from a turning state to a straight-running state. If no lateral acceleration is applied by a driver's accelerator pedal operation, the target vehicle speed V* is calculated based on the road friction coefficient $\mu$ and the lateral acceleration limit Yg*. The target vehicle speed V* is also calculated based on the road friction coefficient $\mu$ and the lateral acceleration limit Yg* when the accelerator pedal depression θth is undetectable. In such cases, it is possible to allow the intervention of deceleration control on the vehicle in accordance with road friction conditions and attain stable, smooth vehicle turning behavior.

Figure 7:
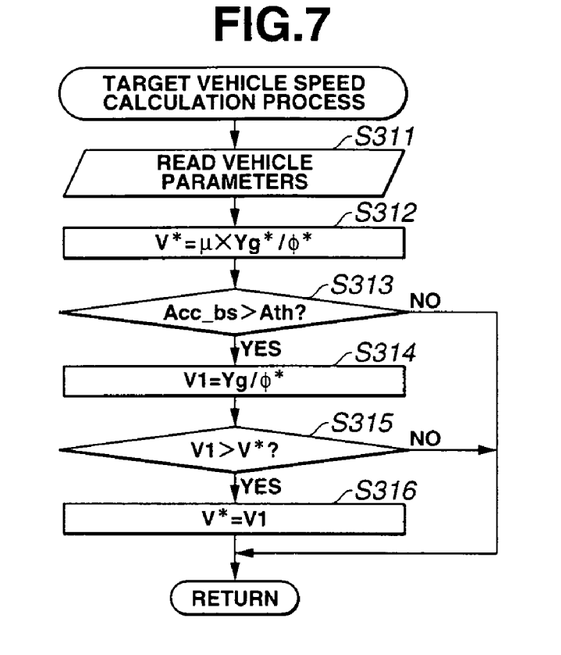
FIG. 7 is a flowchart of a target vehicle speed calculation subroutine program of the deceleration controller according to the second embodiment of the invention.

Next, the second embodiment will be described below with reference to FIG. 7. The second embodiment is similar to the first embodiment, except that the target vehicle speed V* is given upon selection of the higher one of the target vehicle speed values calculated based on the road friction coefficient $\mu$ and the lateral acceleration sensor value Yg, respectively, when the accelerator pedal is operated, in the target vehicle speed calculation subroutine.

At step S311, target vehicle speed calculation unit 22 first reads the road friction coefficient $\mu$, the lateral acceleration sensor value Yg, the lateral acceleration limit Yg*, the yaw rate selection value $\phi$* and the base throttle opening Acc_bs.

At step S312, target vehicle speed calculation unit 22 calculates the target vehicle speed V* from the road friction coefficient $\mu$, the lateral acceleration limit Yg* and the yaw rate selection value $\phi$* according to the above expression (2).

At step S313, target vehicle speed calculation unit 22 judges whether the base throttle opening Acc_bs is larger than a given accelerator operation threshold Ath. If Acc_bs>Ath (Yes at step S313), program control proceeds to step S312. If Acc_bs≦Ath (No at step S313), control exits from the timer interruption subroutine and returns to the main routine.

At step S314, target vehicle speed calculation unit 22 gives an alternative possible target vehicle speed value V1 by the following expression (10):

$$V1 = Yg/\phi^* \tag{10}$$

where $\phi$* is the yaw rate selection value; and Yg is the lateral acceleration sensor value.

It is clear from comparison of the expressions (2) and (10) that the lateral acceleration sensor value Yg is used in the expression (10) in place of the lateral acceleration calculation value $\mu$×Yg* used in the expression (2). This makes it possible to reflect the lateral acceleration sensor value Yg* through the target vehicle speed V* and set the target vehicle speed V* irrespective of the road friction coefficient $\mu$ and the lateral acceleration limit Yg*.

At step S315, target vehicle speed calculation unit 22 compares the alternative possible target vehicle speed V1 with the target vehicle speed V* to judge whether the alternative possible target vehicle speed V1 is higher than the target vehicle speed V*. If V1>V* (Yes at step S315), program control proceeds to step S316. If V1≦V* (No at step S315), control exits from the timer interruption subroutine and directly returns to the main routine.

At step S316, target vehicle speed calculation unit 22 sets the target vehicle speed V* to the target vehicle speed value V1 as indicated by the following expression (11):

$$V^* = V1 \tag{11}$$

After that, control exits from the timer interruption subroutine and returns to the main routine.

In the second embodiment, target vehicle speed calculation unit 22 has a first target vehicle speed calculating section (corresponding to step S312) for giving a first vehicle speed value by dividing the multiplication product of the road friction coefficient $\mu$ and the lateral acceleration limit Yg* by the yaw rate $\phi$*, a third vehicle speed calculating section (corresponding to step S314) for giving a third target vehicle speed value by dividing the lateral acceleration sensor value Yg by the yaw rate $\phi$* and a correcting section (corresponding to steps S313 and S315–S316) for switching between the first and third target vehicle speed values to correct the target vehicle speed V* depending on the accelerator pedal depression θth and the lateral acceleration sensor value Yg and thereby adjust the amount of deceleration control on the vehicle in a similar manner as in the first embodiment. In other words, the target vehicle speed V* is calculated based on the lateral acceleration sensor value Yg according to the expression (10) when the accelerator pedal depression θth is detected in a situation that the vehicle undergoes high lateral acceleration, so that the target vehicle speed V* increases with the lateral acceleration Yg regardless of whether the road friction coefficient $\mu$ is underestimated. It is thus possible to perform deceleration control on the vehicle without giving a stall feeling to the driver at the time the vehicle shifts from a turning state to a straight-running state. If there is no increase in lateral acceleration under low-friction road conditions even tough the accelerator pedal depression θth is detected, the target vehicle speed V* is calculated using the road friction coefficient $\mu$ and the lateral acceleration limit Yg* according to the expression (2). The target vehicle speed V* is also calculated using the road friction coefficient $\mu$ and the lateral acceleration limit Yg* according to the expression (2) when the accelerator pedal depression θth is undetectable. In such cases, it is possible to allow the intervention of deceleration control on the vehicle in accordance with road friction conditions and attain stable, smooth vehicle turning behavior.

Figure 8:
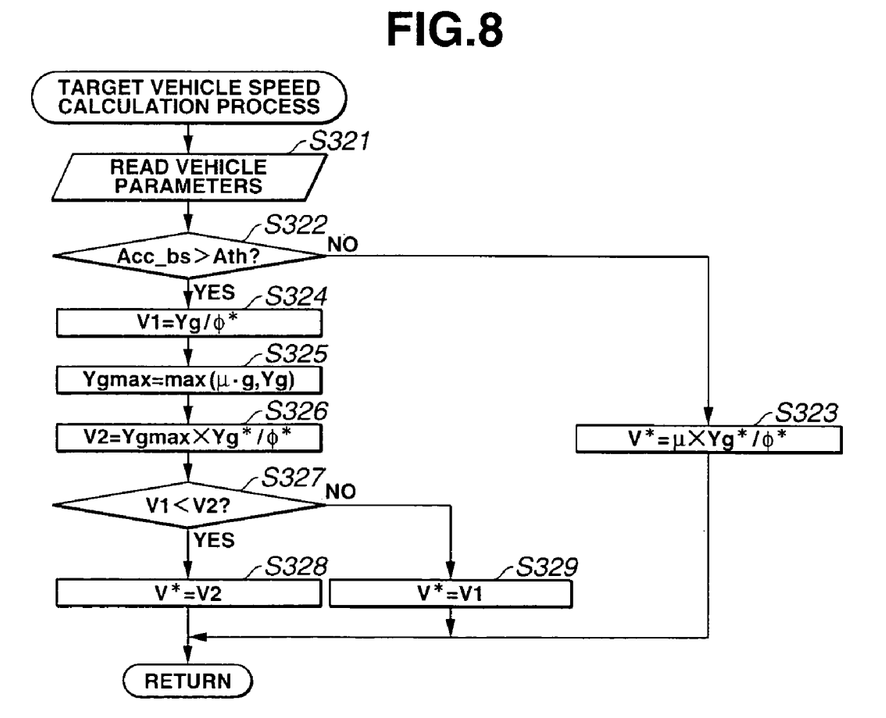
FIG. 8 is a flowchart of a target vehicle speed calculation subroutine program of the deceleration controller according to the third embodiment of the invention.

The third embodiment will be described below with reference to FIG. 8. The third embodiment is similar to the first and second embodiments, except that the target vehicle speed V* is given upon selection of the higher one of the target vehicle speed values calculated based on the lateral acceleration sensor value Yg and the select-high value Ygmax, respectively, when the accelerator pedal is operated, in the target vehicle speed calculation subroutine.

At step S321, target vehicle speed calculation unit 22 reads the road friction coefficient $\mu$, the lateral acceleration sensor value Yg, the lateral acceleration limit Yg*, the yaw rate selection value $\phi$* and the base throttle opening Acc_bs.

At step S322, target vehicle speed calculation unit 22 judges whether the base throttle opening Acc_bs is larger than a given accelerator operation threshold Ath. If Acc_bs$\leq$Ath (No at step S322), program control proceeds to step S323. If Acc_bs>Ath (Yes at step S322), program control proceeds to step S324.

At step S323, target vehicle speed calculation unit 22 calculates the target vehicle speed V* from the road friction coefficient $\mu$, the lateral acceleration limit Yg* and the yaw rate selection value $\phi$* according to the above expression (2).

At step S324, target vehicle speed calculation unit 22 gives a first alternative possible target vehicle speed value V1 from the lateral acceleration sensor value Yg and the yaw rate selection value $\phi$* by the above expression (10).

At step S325, target vehicle speed calculation unit 22 selects the higher one of the lateral acceleration sensor value Yg and the multiplication product $\mu$×g as indicated by the above expression (3).

Then, target vehicle speed calculation unit 22 gives at step S326 a second alternative possible target vehicle speed value V2 by the following expression (12):

$$V2 = Ygmax \times Yg^*/\phi^* \quad (12)$$

where $\phi$* is the yaw rate selection value; Yg* is the lateral acceleration limit; and Ygmax is the higher one of the lateral acceleration sensor value Yg and the multiplication product $\mu$×g selected at step S325.

At step S327, target vehicle speed calculation unit 22 makes a comparison between the first and second alternative possible target vehicle speed values V1 and V2 to judge whether the second alternative possible target vehicle speed value V2 is higher than the first alternative possible target vehicle speed value V1. If V2>V1 (Yes at step S327), program control proceeds to step S328. If V2$\leq$V1 (No at step S327), program control proceeds to step S329.

At step S328, target vehicle speed calculation unit 22 sets the target vehicle speed V* to the second alternative possible target vehicle speed value V2. After that, control exits from the timer interruption subroutine and returns to the main routine.

At step S329, target vehicle speed calculation unit 22 sets the target vehicle speed V* to the first alternative possible target vehicle speed value V1. Control then exits from the timer interruption subroutine and returns to the main routine.

In the third embodiment, target vehicle speed calculation unit 22 has a first target vehicle speed calculating section (corresponding to step S323) for giving a first vehicle speed value by dividing the multiplication product of the road friction coefficient $\mu$ and the lateral acceleration limit Yg* by the yaw rate $\phi$*, a second vehicle speed calculating section (corresponding to steps S325–S326) for giving a second target vehicle speed value by selecting the higher one of the lateral acceleration sensor value Yg and the multiplication result $\mu$×g and then dividing the multiplication product of the thus-obtained select-high value Ygmax (=Yg or $\mu$×g) and the lateral acceleration limit Yg* by the yaw rate $\phi$*, a third vehicle speed calculating section (corresponding to step S324) for giving a third target vehicle speed value by dividing the lateral acceleration sensor value Yg by the yaw rate $\phi$*, and a correcting section (corresponding to steps S322 and S327–S329) for switching among the first, second and third target vehicle speed values to correct the target vehicle speed V* depending on the accelerator pedal depression $\theta$th and the lateral acceleration sensor value Yg and thereby adjust the amount of deceleration control on the vehicle in a similar manner as in the first and second embodiments. In other words, the target vehicle speed V* is calculated based the lateral acceleration sensor value Yg according to the expression (10) when the accelerator pedal depression $\theta$th is detected in a situation that the vehicle undergoes high lateral acceleration, so that the target vehicle speed V* increases with the lateral acceleration Yg regardless of whether the road friction coefficient $\mu$ is underestimated. It is thus possible to perform deceleration control on the vehicle without giving a stall feeling to the driver at the time the vehicle shifts from a turning state to a straight-running state. If there is no or little increase in lateral acceleration under low-friction road conditions even tough the accelerator pedal depression $\theta$th is detected, the target vehicle speed V* is calculated based on the road friction coefficient $\mu$ and the lateral acceleration limit Yg* according to the expressions (3) and (12). The target vehicle speed V* is calculated based on the road friction coefficient $\mu$ and the lateral acceleration limit Yg* according to the expression (2) when the accelerator pedal depression $\theta$th is undetectable. In such cases, it is possible to allow the intervention of deceleration control on the vehicle in accordance with road friction conditions and attain stable, smooth vehicle turning behavior.

To sum up, deceleration controller 10 is configured to correct the target vehicle speed V* depending on the accelerator pedal depression $\theta$th and the lateral acceleration Yg so as to decrease the amount of deceleration control on the vehicle and thereby limit the intervention of the vehicle deceleration control when the vehicle undergoes lateral acceleration in response to a driver's accelerator pedal operation in the first to third embodiment. Accordingly, the vehicle deceleration control can be performed appropriately, without giving a stall feeling to the driver, even if the road friction coefficient $\mu$ is underestimated or if the estimation of the road friction coefficient $\mu$ is slow in response to changes in road friction conditions. Deceleration controller 10 is further configured to limit the decrease in the amount of deceleration control on the vehicle when no lateral acceleration is applied even by a driver's accelerator pedal operation under low-friction road conditions and when no driver's acceleration pedal operation is made in the first to third embodiments. The intervention of the vehicle deceleration control can be thus allowed appropriately in accordance with road conditions so as to attain stable vehicle behavior.

Figure 9:
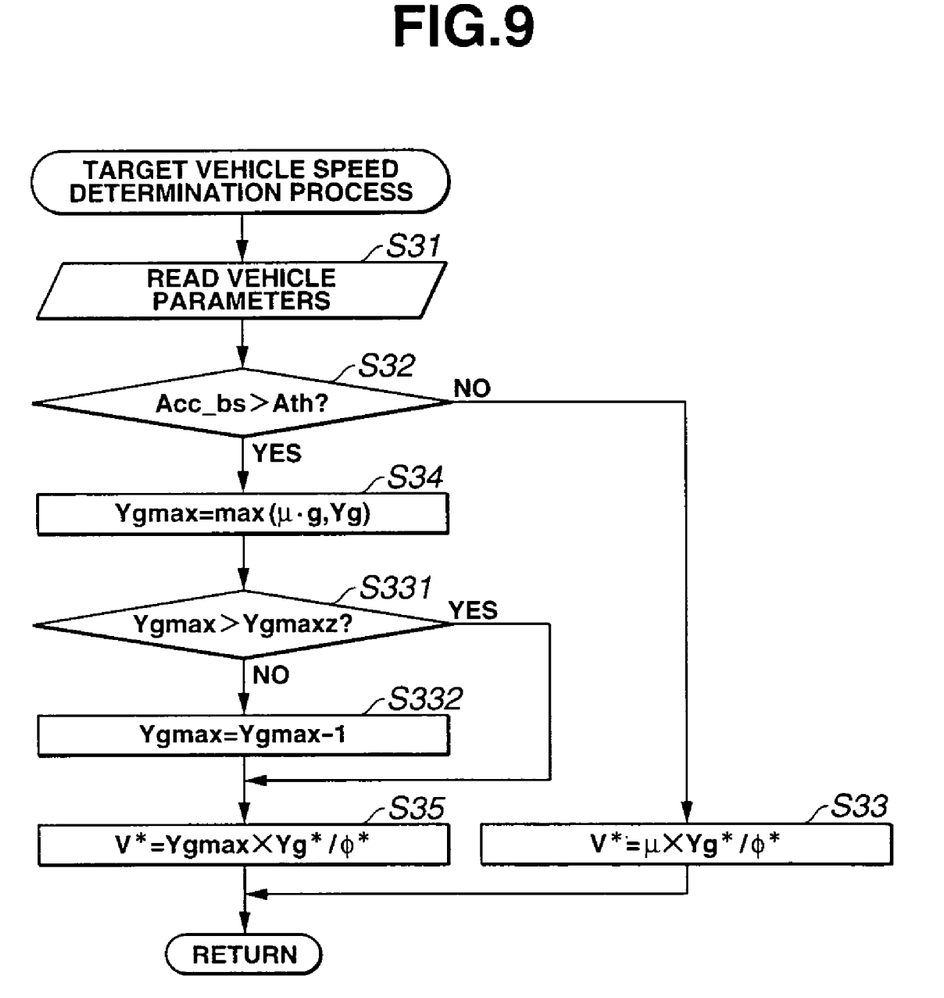
FIG. 9 is a flowchart of a target vehicle speed calculation subroutine program of the deceleration controller according to the fourth embodiment of the invention.

The first and third embodiments may be modified so as to determine the select-high value Ygmax in keeping with a positive change (increase) thereof. For example, the fourth embodiment can be given as such a modification. The fourth embodiment is similar to the first embodiment, except that the target vehicle speed calculation subroutine additionally includes steps S331 and S332 subsequently to step S34 as shown in FIG. 9. At step S331, target vehicle speed calculation unit 22 makes a comparison between the current select-high value Ygmax and the previous select-high value Ygmaxz to judge whether the current select-high value Ygmax is higher than the previous select-high value Ygmaxz. If Ygmax≦Ygmaxz (No at step S331), target vehicle speed calculation unit 22 counts down the select-high value Ygmax by a given degree as indicated by the following expression (15) at step S332:

$$Ygmax = Ygmax - 1 \quad (15).$$

When there is a positive change in the select-high value Ygmax, the select-high value Yg is used as it stands. On the other hand, the select-high value Ygmax is adjusted according to the expression (15) when there is a negative change in the select-high value Ygmax. This makes it possible to secure a maximum possible target lateral acceleration and prevent hunting.

The entire contents of Japanese Patent Application No. 2004-073125 (filed on Mar. 15, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. Target vehicle speed calculation unit 22 may additionally includes a lateral acceleration limit adjusting section to adjust the lateral acceleration limit Yg* to a larger value by e.g. adding a given value (Yg*=Yga+α) to the fixed lateral acceleration limit value Yga upon detection of a driver's accelerator pedal operation though the lateral acceleration limit Yg* is fixed at the given value Yga in the above embodiments. This also makes it possible to increase the target vehicle speed V* so as to limit the intervention of the vehicle deceleration control and avoid giving a stall feeling to the driver. The scope of the invention is defined with reference to the following claims.

What is claimed is:

1. A deceleration control apparatus for an automotive vehicle, comprising:
   an accelerator pedal depression detecting unit that detects an accelerator pedal depression of the vehicle;
   a lateral acceleration detecting unit that detects an actual lateral acceleration of the vehicle;
   a yaw rate determination unit that determines an actual yaw rate of the vehicle;
   a road friction coefficient estimation unit that estimates a friction coefficient of a road on which the vehicle is traveling;
   a target vehicle speed calculation unit that calculates a target vehicle speed; and
   a deceleration control unit that performs deceleration control on the vehicle so that the vehicle reaches the target vehicle speed,
   the target vehicle speed calculation unit having:
   a first target vehicle speed calculating section to give as the target vehicle speed a first target vehicle speed value by dividing a multiplication product of the estimated road friction coefficient and a predetermined target lateral acceleration limit by the determined actual yaw rate; and
   a target vehicle speed correcting section to correct the target vehicle speed depending on the accelerator pedal depression and the detected actual lateral acceleration, so as to adjust the amount of said deceleration control on the vehicle.

2. The deceleration control apparatus as defined in claim 1, the target vehicle speed calculation unit having a second target vehicle speed calculating section to give a second target vehicle speed value by selecting a higher one of the detected actual lateral acceleration and a result of multiplying the estimated road friction coefficient by a gravitational acceleration and then dividing a multiplication product of said selected higher one and said predetermined target lateral acceleration limit by the determined actual yaw rate.

3. The deceleration control apparatus as defined in claim 1, the target vehicle speed calculation unit having a third target vehicle speed calculating section to give a third target vehicle speed value by dividing the detected actual lateral acceleration by the determined actual yaw rate.

4. The deceleration control apparatus as defined in claim 2, the target vehicle speed correcting section selecting the first target vehicle speed value as the target vehicle speed when the accelerator pedal depression is undetectable, and selecting the second target vehicle speed value as the target vehicle speed when the accelerator pedal depression is detected.

5. The deceleration control apparatus as defined in claim 3, the target vehicle speed correcting section selecting as the target vehicle speed a higher one of the first and third target vehicle speed values when the accelerator pedal depression is detected.

6. The deceleration control apparatus as defined in claim 2, the target vehicle speed calculation unit further having a third target vehicle speed calculating section to give a third target vehicle speed by dividing the detected actual lateral acceleration by the determined actual yaw rate, and the target vehicle speed correcting section selecting as the target vehicle speed a higher one of the second and third target vehicle speed values when the accelerator pedal depression is detected.

7. The deceleration control apparatus as defined in claim 1, the target vehicle speed calculation unit having a target lateral acceleration limit adjusting section to increase the target lateral acceleration limit upon detection of the accelerator pedal depression.

8. An apparatus for performing deceleration control on an automotive vehicle in accordance with a turning state of the vehicle, comprising:
   means for determining an actual yaw rate of the vehicle;
   means for detecting an actual lateral acceleration of the vehicle;
   means for detecting an accelerator pedal depression of the vehicle;
   means for estimating a friction coefficient of a road on which the vehicle is traveling;
   means for calculating a target vehicle speed based on the estimated road friction coefficient, the detected actual lateral acceleration and the detected accelerator pedal operation;
   means for calculating a target deceleration from the target vehicle speed; and
   means for controlling engine throttle opening and brake fluid pressure of the vehicle according to the target deceleration.

9. The apparatus as defined in claim 8, further comprising means for setting a lateral acceleration limit,
   wherein said target vehicle speed calculating means includes: means for judging whether the detected accelerator pedal depression is larger than a given threshold; means for selecting a higher one of the detected actual lateral acceleration and a result of multiplying the estimated road friction coefficient by a gravitational acceleration; and means for giving the target vehicle speed by the following expression (A) when the detected accelerator pedal depression is smaller than or equal to the threshold and giving the target vehicle speed by the following expression (B) when the detected accelerator pedal depression is larger than the threshold:

$$V^* = \mu \times Yg^*/\phi^* \qquad (A)$$

$$V^* = Ygmax \times Yg^*/\phi^* \qquad (B)$$

where $V^*$ is the target vehicle speed; $\mu$ is the estimated road friction coefficient; $Yg^*$ is the lateral acceleration limit; Ygmax is the higher one of the detected actual lateral acceleration and the result of multiplying the estimated road friction coefficient by the gravitational acceleration; and $\phi^*$ is the determined actual yaw rate.

10. The apparatus as defined in claim 8, further comprising means for setting a lateral acceleration limit, wherein said target vehicle speed calculating means includes: means for judging whether the detected accelerator pedal depression is larger than a given threshold; means for calculating the target vehicle speed according to the following expression (A); means for giving an alternative possible target vehicle speed value by the following expression (C); means for comparing the alternative possible target vehicle sped value with the calculated target vehicle speed; and means for setting the target vehicle speed to the alternative possible target vehicle speed value when the detected accelerator pedal depression is larger than the predetermined threshold or when the alternative possible target vehicle speed is higher than the calculated target vehicle speed:

$$V^* = \mu \times Yg^*/\phi^* \qquad (A)$$

$$V1 = Yg/\phi^* \qquad (C)$$

where $V^*$ is the vehicle speed value; V1 is the alternative possible target vehicle speed value; $\mu$ is the estimated road friction coefficient; $Yg^*$ is the lateral acceleration limit; Yg is the detected actual lateral acceleration; and $\phi^*$ is the determined actual yaw rate.

11. The apparatus as defined in claim 8, further comprising means for setting a lateral acceleration limit, wherein said target vehicle speed calculating means includes: means for judging whether the detected accelerator pedal depression is larger than a given threshold; means for calculating the target vehicle speed according to the following expression (A) when the detected accelerator pedal depression is smaller than or equal to the threshold; means for selecting a higher one of the detected actual lateral acceleration and a result of multiplying the estimated road friction coefficient by a gravitational acceleration; means for giving first and second alternative possible target vehicle speed values by the following expressions (B) and (C), respectively; and means for setting the target vehicle speed to a higher one of the first and second possible target vehicle speed values when the defected accelerator pedal depression is larger than the threshold:

$$V^* = \mu \times Yg^*/\phi^* \qquad (A)$$

$$V1 = Yg/\phi^* \qquad (B)$$

$$V2 = Ygmax \times Yg^*/\phi^* \qquad (C)$$

where $V^*$ is the target vehicle speed; V1 is the first alternative possible target vehicle speed value; V2 is the second alternative possible target vehicle speed value; $\mu$ is the estimated road friction coefficient; Yg is the detected actual lateral acceleration; $Yg^*$ is the lateral acceleration limi; Ygmax is the higher one of the detected actual lateral acceleration and the result of multiplying the estimated road friction coefficient by the gravitational acceleration; and $\phi^*$ is the determined actual yaw rate.

12. The apparatus as defined in claim 8, wherein said controlling means includes: means for judging whether the target deceleration is larger than zero; and means for gradually decreasing the engine throttle opening to zero and increasing the brake fluid pressure to a predetermined level when the target deceleration is larger than zero.

13. The apparatus as defined in claim 9, wherein said target vehicle speed calculating means further includes: means for making a comparison between current and previous values of said selected higher one of the detected actual lateral acceleration and the result of multiplying the estimated road friction coefficient by the gravitational acceleration; and means for counting down said selected higher one of the detected actual lateral acceleration and the result of multiplying the estimated road friction coefficient by the gravitational acceleration by a given degree when said current value is lower than said previous value.

14. The apparatus as defined in claim 11, wherein said target vehicle speed calculating means further includes; means for making a comparison between current and previous values of said selected higher one of the detected actual lateral acceleration and the result of multiplying the estimated road friction coefficient by the gravitational acceleration; and means for counting down said selected higher one of the detected actual lateral acceleration and the result of multiplying the estimated road friction coefficient by the gravitational acceleration by a given degree when said current value is lower than said previous value.

15. The apparatus as defined in claim 8, wherein said yaw rate determining means includes: means for obtaining an actual measurement value of the vehicle yaw rate; means for obtaining a calculation value of the vehicle yaw rate; and means for selecting a higher one of the yaw rate measurement value and the yaw rate calculation value as the actual yaw rate of the vehicle.

16. A method for performing deceleration control on an automotive vehicle, comprising in accordance with a turning state of the vehicle:

determining an actual yaw rate of the vehicle;

detecting an actual lateral acceleration of the vehicle;

detecting an accelerator pedal depression of the vehicle;

estimating a friction coefficient of a road on which the vehicle is traveling;

calculating a target vehicle speed based on the estimated road friction coefficient, the detected actual lateral acceleration and the detected accelerator pedal depression;

calculating a target deceleration from the target vehicle speed; and controlling engine throttle opening and brake fluid pressure of the vehicle according to the target deceleration.

* * * * *